United States Patent
Kwak et al.

(10) Patent No.: US 10,791,893 B2
(45) Date of Patent: Oct. 6, 2020

(54) VACUUM CLEANER AND METHOD FOR CONTROLLING THE SAME

(71) Applicant: LG ELECTRONICS INC., Seoul (KR)

(72) Inventors: Donghoon Kwak, Seoul (KR); Jaehwan Ko, Seoul (KR); Sihyuk Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 318 days.

(21) Appl. No.: 15/739,513

(22) PCT Filed: Jun. 21, 2016

(86) PCT No.: PCT/KR2016/006583
§ 371 (c)(1),
(2) Date: Dec. 22, 2017

(87) PCT Pub. No.: WO2016/208944
PCT Pub. Date: Dec. 29, 2016

(65) Prior Publication Data
US 2018/0177360 A1    Jun. 28, 2018

(30) Foreign Application Priority Data

Jun. 23, 2015  (KR) .......................... 10-2015-0088785

(51) Int. Cl.
*A47L 9/00*    (2006.01)
*A47L 9/28*    (2006.01)
(Continued)

(52) U.S. Cl.
CPC .............. *A47L 9/009* (2013.01); *A47L 5/362* (2013.01); *A47L 5/365* (2013.01); *A47L 9/28* (2013.01);
(Continued)

(58) Field of Classification Search
CPC ........ A47L 9/009; A47L 9/2805; A47L 5/362; A47L 5/365; A47L 9/28; A47L 9/2852;
(Continued)

(56) References Cited

U.S. PATENT DOCUMENTS 6,226,830 B1    5/2001    Hendriks et al.

FOREIGN PATENT DOCUMENTS

| EP | 2420170 | 2/2012 |
|---|---|---|
| JP | 2002-282179 | 10/2002 |

(Continued)

OTHER PUBLICATIONS

European Search Report in European Appln. No. 16814657.9, dated Nov. 30, 2018, 8 pages.

*Primary Examiner* — David Redding
(74) *Attorney, Agent, or Firm* — Fish & Richardson P.C.

(57) ABSTRACT

A vacuum cleaner according to an embodiment of the present invention includes a cleaner body having a moving unit; a suction unit configured to suction dust and air; a detecting unit configured to detect movement of the suction unit; and a control part configured to determine whether movement of the cleaner body is required, based on information detected by the suction unit, and to control the moving unit when the movement of the cleaner body is required, wherein the control part determines a target location to which the cleaner body will be moved, determines a moving route to the target location based on a detected obstacle, controls the moving unit so that the cleaner body is moved along the determined moving route, stops a motor when it is determined that the cleaner body is not in contact with a floor surface, and thus prevents a user's injury.

16 Claims, 4 Drawing Sheets

(51) Int. Cl.
    *A47L 5/36*          (2006.01)
    *G05D 1/02*         (2020.01)

(52) U.S. Cl.
    CPC .......... *A47L 9/2805* (2013.01); *A47L 9/2852* (2013.01); *A47L 9/2889* (2013.01); *G05D 1/0242* (2013.01); *G05D 1/0255* (2013.01); *A47L 2201/04* (2013.01); *G05D 2201/0215* (2013.01)

(58) Field of Classification Search
    CPC . A47L 9/2889; A47L 2201/04; G05D 1/0242; G05D 1/0255; G05D 2201/0215
    IPC ....................................................... A47L 9/28
    See application file for complete search history.

(56) References Cited

FOREIGN PATENT DOCUMENTS

| | | |
|---|---|---|
| JP | 2005-211360 | 8/2005 |
| KR | 10-2008-0008142 | 1/2008 |
| KR | 10-2010-0081251 | 7/2010 |
| KR | 10-2012-0017846 | 2/2012 |

[Fig. 1]
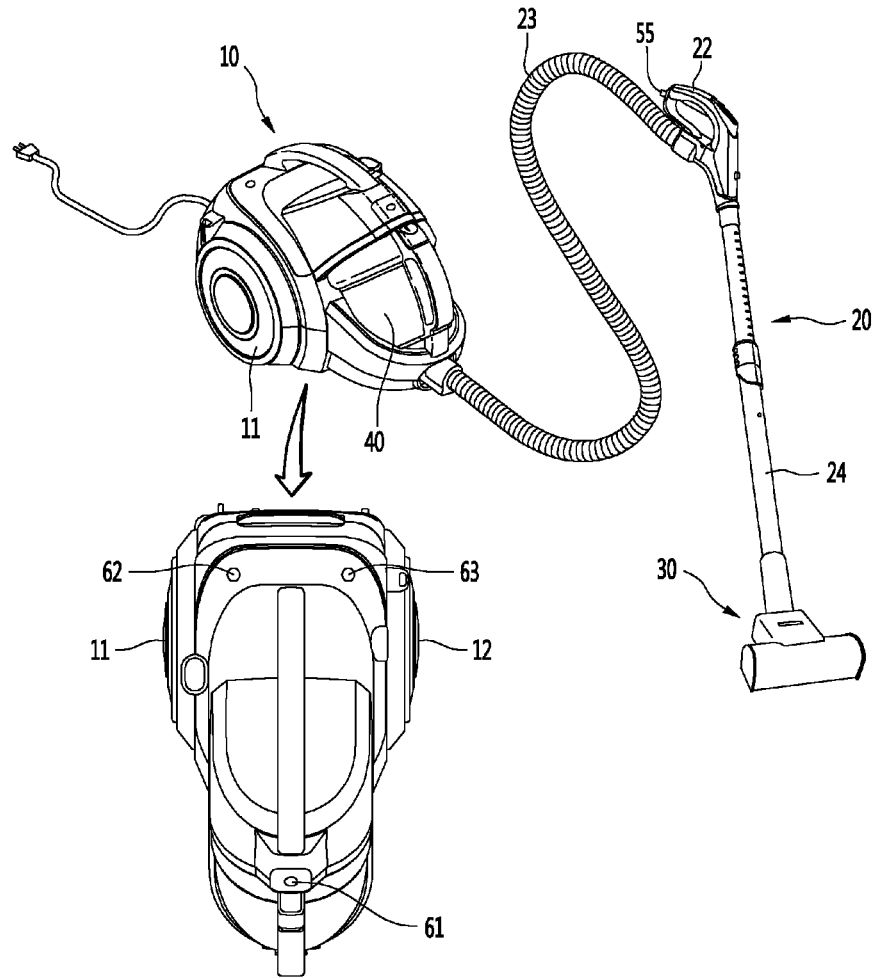
[Fig. 2]
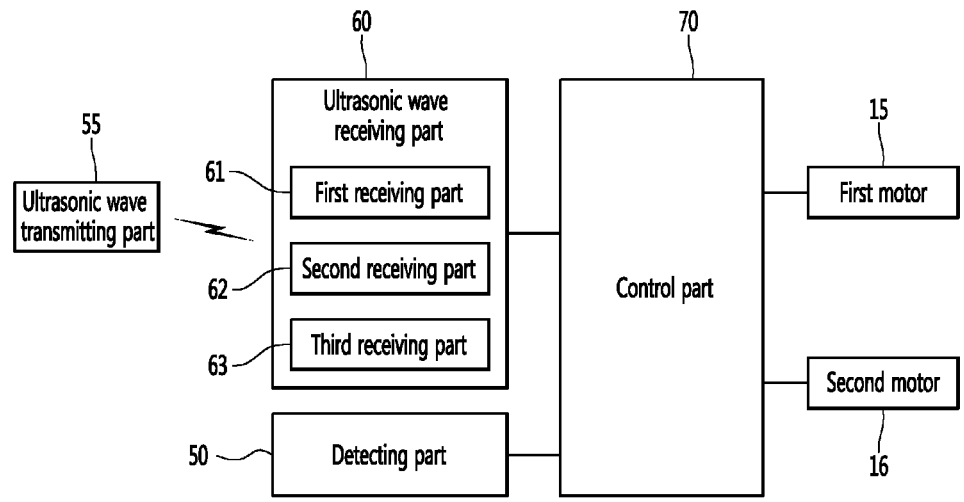

[Fig. 3]
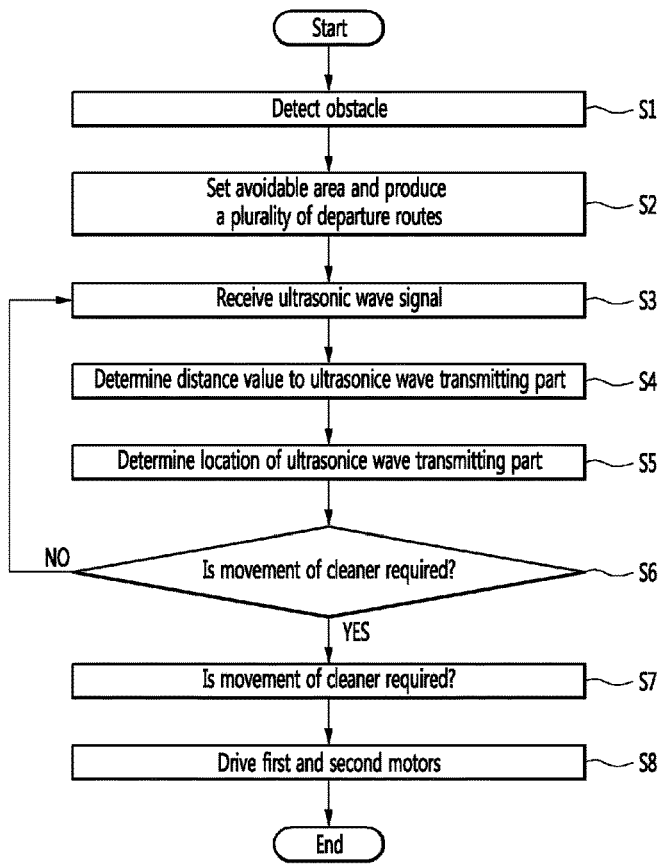
[Fig. 4]
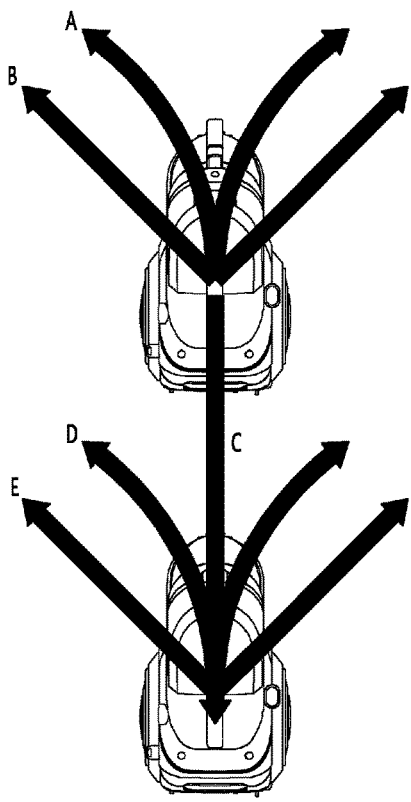

[Fig. 5]
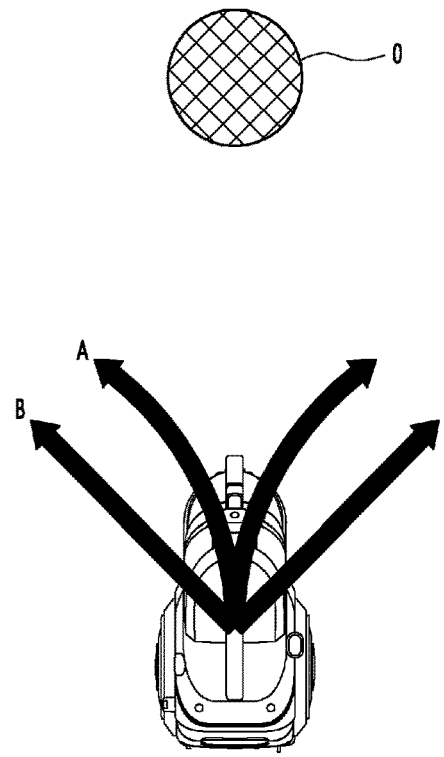
[Fig. 6]
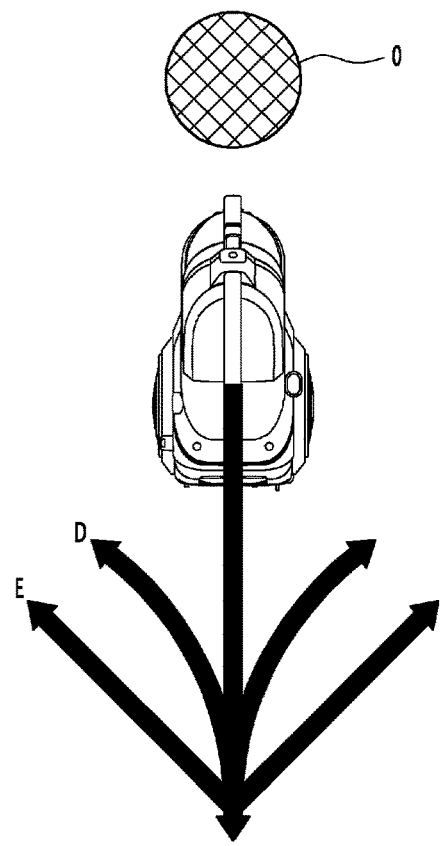

[Fig. 7]
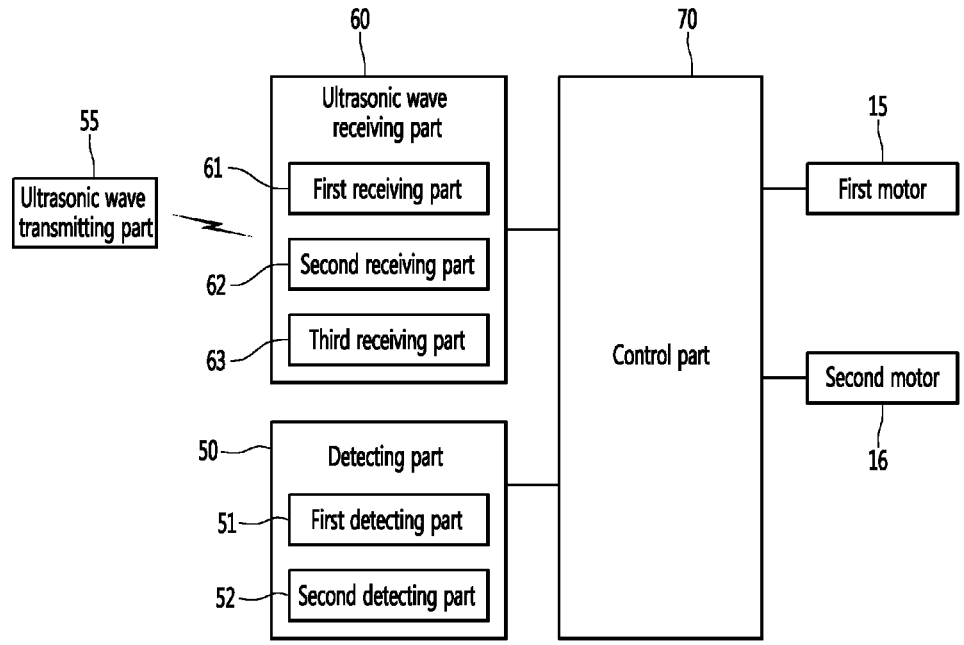
[Fig. 8]
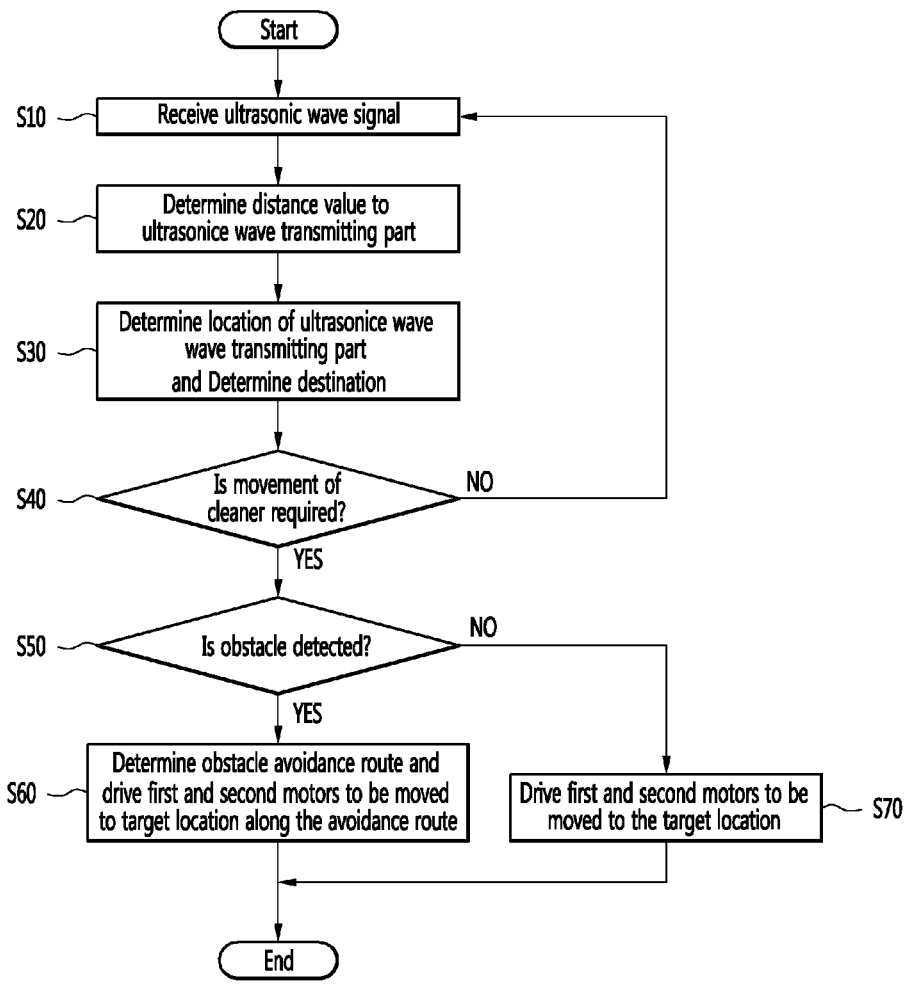

VACUUM CLEANER AND METHOD FOR CONTROLLING THE SAME

CROSS-REFERENCE TO RELATED APPLICATIONS

This application is a National Stage application under 35 U.S.C. § 371 of International Application No. PCT/KR2016/006583, filed on Jun. 21, 2016, which claims the benefit of Korean Patent Application No. 10-2015-0088785, filed on Jun. 23, 2015. The disclosures of the prior applications are incorporated by reference in their entirety.

TECHNICAL FIELD

The present invention relates to a vacuum cleaner and a method for controlling the same.

BACKGROUND ART

Generally, a vacuum cleaner is an apparatus which suctions dust and foreign substances scattered on a surface to be cleaned using a suction motor installed inside a main body, and filters the dust and the foreign substances in the main body.

The vacuum cleaner having such a function may be classified into an up-right type in which a suction nozzle as a suction port is integrally formed with the main body, and a canister type in which the suction nozzle is in communication with the main body through a connection pipe.

Meanwhile, in Korean Patent Publication No. 2010-0053098 (published on May 20, 2010), there is disclosed a vacuum cleaner.

The vacuum cleaner includes a wheel which enables a cleaner body to be easily moved, and a driving part which drives the wheel. The vacuum cleaner detects a rotational and translational motion of a moving member, and controls an operation of the driving part.

Since such a vacuum cleaner should have a structure which enables the moving member to be rotatable and also to simultaneously perform the translational motion, the vacuum cleaner has a complex structure. Also, since the vacuum cleaner may detect a mechanical motion and may move the driving part, but may not exactly detect a user's actual movement, it is difficult for the cleaner body to be exactly moved toward the user. And since the vacuum cleaner may not recognize an obstacle in advance, there is a risk of colliding with the obstacle. When the user performs a cleaning operation while holding the cleaner body to clean a space other than a floor, the moving member may perform the translational motion or the rotational motion. In this case, since the wheel of the cleaner may be rotated by the driving part, the user may be injured by the rotating wheel, or the user's clothes may be caught in a gap between the wheel and the cleaner body.

DISCLOSURE OF INVENTION

Technical Problem

The present invention is directed to providing a vacuum cleaner in which a cleaner body is able to recognize an obstacle, and to move along a user's moving direction while avoiding the obstacle, and a method for controlling the same.

Solution to Problem

One aspect of the present invention provides a vacuum cleaner including a cleaner body having a moving unit for movement; a suction unit connected to the cleaner body, configured to suction dust and air and to guide the suctioned dust and air to the cleaner body, and having a handle; a first detecting unit configured to detect movement of the suction unit; a second detecting unit provided at the cleaner body to detect an obstacle; and a control part configured to determine a target location to which the cleaner body will be moved, based on information detected by the first detecting unit, to determine a moving route to the target location based on the determined target location and the obstacle detected by the second detecting unit, and to control the moving unit so that cleaner body is moved along the determined moving route.

The moving route may be an avoidance route along which the cleaner body moves while avoiding the obstacle.

Another aspect of the present invention provides a method for controlling a vacuum cleaner, including determining existence and absence of an obstacle, and detecting movement of a suction unit connected to a cleaner body, and setting a target location to which the cleaner body will be moved; determining a moving route of the cleaner body based on the obstacle and the target location to which the cleaner body will be moved; and controlling the cleaner body to be moved along the moving route.

Advantageous Effects of Invention

According to the proposed invention, when it is necessary to move the cleaner body in the direction in which a user moves, it is possible to be moved while avoiding the obstacle on the route toward the destination at which the user is located, and thus the cleaner body can be rapidly and accurately moved in the direction which the user moves.

Also, since lifting-up of the cleaner body is detected, and the rotation of the wheels is controlled, the user can be prevented from being injured by the rotation of the wheels.

Also, since the rotation of the wheels is prevented when the lifting-up of the cleaner body is detected, the user's clothes can be prevented from being caught in a gap between the wheel and the cleaner body due to the rotation of the wheels.

BRIEF DESCRIPTION OF DRAWINGS

FIG. 1 is a perspective view of a vacuum cleaner according to one embodiment of the present invention.

FIG. 2 is a block diagram of the vacuum cleaner according to one embodiment of the present invention.

FIG. 3 is a flowchart illustrating a method for controlling the vacuum cleaner according to one embodiment of the present invention.

FIG. 4 is a view illustrating a plurality of departure routes of the cleaner body FIG. 5 is a view illustrating a departure route of the cleaner body when the distance between the cleaner body and the obstacle is more than a reference distance.

FIG. 6 is a view illustrating a departure route of the cleaner body when the distance between the cleaner body and the obstacle is the reference distance or less.

FIG. 7 is a block diagram of a vacuum cleaner according to another embodiment of the present invention.

FIG. 8 is a flowchart illustrating a method for controlling the vacuum cleaner according to another embodiment of the present invention.

MODE FOR THE INVENTION

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

FIG. 1 is a perspective view of a vacuum cleaner according to one embodiment of the present invention, and FIG. 2 is a block diagram of the vacuum cleaner according to one embodiment of the present invention.

Referring to FIGS. 1 and 2, a vacuum cleaner 1 according to one embodiment of the present invention may include a cleaner body 10 which has a suction motor 14 for generating a suction force, and a suction unit 20 which is connected to the cleaner body 10 and suctions air and foreign substances on a floor surface.

The cleaner body 10 may include a moving unit for movement of the cleaner body 10. The moving unit may include a plurality of wheels 11 and 12. The plurality of wheels 11 and 12 may be disposed at both sides of the cleaner body 10. The plurality of wheels 11 and 12 may include a first wheel 11 which is disposed at a right side of the cleaner body 10, and a second wheel 12 which is disposed at a left side thereof. Also, the moving unit may include one or more subsidiary wheels, but is not limited thereto.

Therefore, the cleaner body 10 may be three-point (or more) supported on the floor surface by the first and second wheels and one or more subsidiary wheels, and may be two-point supported by the first and second wheels.

A dust container 40 in which dust separated from the air is stored may be detachably connected to the cleaner body 10.

The suction unit 20 may include a suction nozzle 30 which is moved along the floor surface, and a connection unit which connects the suction nozzle 30 to the cleaner body 10. The connection unit may include an extension pipe 24 which is connected to the suction nozzle 30, a handle 22 which is connected to the extension pipe 24, and a connection hose 23 which connects the handle 22 to the cleaner body 10.

The moving unit may further include a plurality of motors 15 and 16 which rotate the plurality of wheels 11 and 12, respectively. The plurality of motors 15 and 16 may include a first motor 15 and a second motor 16. The first motor 15 may rotate the first wheel 11, and the second motor 16 may rotate the second wheel 12. Each of the motors 15 and 16 may be independently operated. By an independent operation of each of the motors 15 and 16, the cleaner body 10 may be automatically moved forward and backward, and may also turn left and right.

The vacuum cleaner 1 may further include a detecting part 50. The detecting part 50 may detect existence and absence of an obstacle. For example, the detecting part 50 may detect a distance from the obstacle. Also, the detecting part 50 may detect a distance from the floor surface.

The detecting part 50 may include a light wave transmitting part and one or more light wave receiving parts. The light wave transmitting part transmits a light wave, and the one or more light wave receiving parts receive the light wave which is transmitted from the light wave transmitting part, and reflected by the obstacle or the floor surface.

The light wave transmitting part and the one or more light wave receiving parts are provided at a lower side of the cleaner body 10, and may be disposed toward an outside of the cleaner body 10.

For example, when a plurality of light wave receiving parts are provided, one light wave receiving part may be disposed at a front surface of the cleaner body 10, and another light wave receiving part may be disposed at a lower surface of the cleaner body 10. In this case, the light wave receiving parts may be disposed at a lower end of the front surface of the cleaner body 10, a front end of the lower surface thereof, or a corner thereof which is a connection portion between the front surface and the lower surface of the cleaner body 10. Alternatively, the light wave receiving parts may be disposed at the front surface of the cleaner body 10 to be spaced up and down, and each of the plurality of detecting parts 50 may be configured to simultaneously detect existence of the obstacle and the distance from the floor surface.

The light wave may be infrared light or an ultrasonic wave, and the detecting part 50 is not limited to the embodiment, and any types of sensors may be used as the detecting part 50.

The vacuum cleaner 1 may further include an ultrasonic wave transmitting part 55 which transmits the ultrasonic wave, and an ultrasonic wave receiving part 60 which receives the ultrasonic wave transmitted from the ultrasonic wave transmitting part 55. The ultrasonic wave transmitting part 55 may be located at the suction unit 20. The ultrasonic wave transmitting part 55 may be located at the handle 22 or the suction nozzle 30, but is not limited thereto.

A distance between the suction unit 20 and the cleaner body 10 may be measured using a distance between the ultrasonic wave transmitting part 55 and the ultrasonic wave receiving part 60. That is, in the specification, the distance between the ultrasonic wave transmitting part 55 and the ultrasonic wave receiving part 60 is regarded as the distance between the suction unit 20 and the cleaner body 10.

The ultrasonic wave receiving part 60 may be disposed at the cleaner body 10. The ultrasonic wave receiving part 60 may include a plurality of receiving parts 61, 62 and 63. Each of the plurality of receiving parts 61, 62 and 63 may receive the ultrasonic wave transmitted from the ultrasonic wave transmitting part 55.

When the plurality of receiving parts 61, 62 and 63 are horizontally or vertically projected, lines which connect the plurality of receiving parts 61, 62 and 63 may form a polygon.

For example, the plurality of receiving parts 61, 62 and 63 may include a first receiving part 61, a second receiving part 62 and a third receiving part 63. When the first to third receiving parts 61, 62 and 63 are horizontally or vertically projected, lines which connect the first to third receiving parts 61, 62 and 63 may form a triangle.

A part of the first to third receiving parts 61, 62 and 63 may be disposed to have a different height from that of the other part thereof. Also, two of the first to third receiving parts 61, 62 and 63 may be disposed to be horizontally spaced.

In the embodiment, the ultrasonic wave transmitting part 55 and the ultrasonic wave receiving part 60 may be totally referred to as a first detecting unit, and the detecting part 50 may be referred to as a second detecting unit.

The vacuum cleaner 1 may further include a control part 70 which controls the first motor 15 and the second motor 16. The control part 70 determines a location of the ultrasonic wave transmitting part 55 based on the ultrasonic wave received in the ultrasonic wave receiving part 60, and may operate one or more of the first motor 15 and the second motor 16 when it is necessary to move the cleaner body 10 toward the ultrasonic wave transmitting part 55 of which the location is determined.

In the case in which the ultrasonic wave transmitting part 55 is disposed at the handle 22, when a cleaning operation is performed while moving the handle 22, the ultrasonic wave transmitting part 55 is moved along with the handle 22. In this case, the distance between the ultrasonic wave transmitting part 55 and the ultrasonic wave receiving part 60 may be varied.

A movable distance of the handle 22 corresponds to a length of the connection hose 23, and when the handle 22 is spaced apart from the cleaner body 10 in a predetermined distance, a force of moving the handle 22 is applied to the cleaner body 10, and thus the cleaner body 10 is moved forward.

At this point, when each of the motors 15 and 16 is not operated, a force for moving the cleaner body 10 should be applied by a user. In this case, there is a problem that it is hard for the user. Therefore, in the embodiment, when a distance between the ultrasonic wave transmitting part 55 and the cleaner body 10 is a predetermined distance or more, the control part 70 may control the first motor 15 and the second motor 16 so that the cleaner body 10 is moved toward the handle 22.

The control part 70 may determine a location of the obstacle based on the light wave received in the detecting part 50, and may control the first motor 15 and the second motor 16 so that the cleaner body 10 is moved while avoiding the obstacle.

More specifically, the control part 70 may produce a plurality of departure routes based on the existence and absence of the obstacle and the location thereof. And the control part 70 may select one of the plurality of departure routes as a route along which the cleaner body 10 is actually moved. The selected departure route may be a part of a moving route from a current location of the cleaner body 10 to a target location thereof.

A part or all of the plurality of departure routes may be avoidance routes for avoiding the obstacle. Alternatively, a part or all of the plurality of departure routes may be departure routes when the obstacle does not exist.

The avoidance routes may include a route along which the cleaner body 10 avoids the obstacle by moving forward and bypassing the obstacle or changing a direction thereof, and a route along which the cleaner body 10 moves backward and then moves forward to bypass the obstacle, or changes a direction thereof to one side.

Hereinafter, a method for controlling the vacuum cleaner will be described in detail. FIG. 3 is a flowchart illustrating a method for controlling the vacuum cleaner according to one embodiment of the present invention, FIG. 4 is a view illustrating a plurality of departure routes according to one embodiment of the present invention, FIG. 5 is a view illustrating a departure route of the cleaner body when the distance between the cleaner body and the obstacle is more than a reference distance, and FIG. 6 is a view illustrating a departure route of the cleaner body when the distance between the cleaner body and the obstacle is the reference distance or less.

Referring to FIGS. 3 to 6, while a cleaning operation is performed using the vacuum cleaner 1, the detecting part 50 may detect the existence and absence of an obstacle or the location of the obstacle when the obstacle exists (S1).

More specifically, a light wave is transmitted from the light wave transmitting part, and the light wave receiving part receives the light wave transmitted from the light wave transmitting part.

The control part 70 may determine a distance from the obstacle and relative locations of the obstacle and the cleaner body 10 using the light wave. For example, the control part 70 may determine the distance from the obstacle by calculating a time while the light wave transmitted from the light wave transmitting part is reflected by the obstacle and then received by the light wave receiving part, and may also recognize an angle between the obstacle and the cleaner body 10 in consideration of a distance between each of the plurality of detecting parts 50 and the obstacle. However, in the present invention, a method for determining the distance from the obstacle and the relative locations of the obstacle and the cleaner body 10 is not limited thereto.

The control part 70 may determine a movable area of the cleaner body 10 based on the location of the obstacle, and may produce a plurality of departure routes (S2).

As described above, a part or all of the plurality of departure routes may be avoidance routes. Hereinafter, description will be provided on the assumption that all of the plurality of departure routes are the avoidance routes. And the control part 70 produces the plurality of departure routes along which the vacuum cleaner 1 can avoid the obstacle.

Referring to FIG. 4, the control part 70 may produce the departure routes including, for example, a route A along which the vacuum cleaner 1 moves forward and turns to one side (a left side or a right side), a route B along which the vacuum cleaner 1 changes a direction to one side (the left side or the right side) and then moves forward, a route C along which the vacuum cleaner 1 moves backward straightly, a route D along which the vacuum cleaner 1 moves backward and then turns to one side (the left side or the right side) while moving forward, a route E along which the vacuum cleaner 1 moves backward, then changes the direction to the left side or the right side and moves forward, and so on.

More specifically, referring to FIG. 5, when the distance between the cleaner body 10 and the obstacle O is more than a reference distance, the control part 70 may produce the route A along which the vacuum cleaner 1 moves forward and turns to one side, and the route B along which the vacuum cleaner 1 changes the direction to one side and then moves forward.

Referring to FIG. 6, when the distance between the cleaner body 10 and the obstacle O is the reference distance or less, the control part 70 may produce the route C along which the vacuum cleaner 1 moves backward straightly, the route D along which the vacuum cleaner 1 moves backward and then turns to one side while moving forward, and the route E along which the vacuum cleaner 1 moves backward, then changes the direction and moves forward.

An ultrasonic wave may be transmitted from the ultrasonic wave transmitting part 55. Then, the ultrasonic wave receiving part 60 receives the ultrasonic wave transmitted from the ultrasonic wave transmitting part 55 (S3).

The control part 70 determines a distance value between the ultrasonic wave transmitting part 55 and each of the receiving parts 61, 62 and 63 based on the ultrasonic wave received by each of the receiving parts 61, 62 and 63 (S4).

And the control part 70 determines a location of the ultrasonic wave transmitting part 55 using a plurality of determined distance values (S5).

And the control part 70 determines whether it is necessary to move the cleaner body 10, based on the determined location of the ultrasonic wave transmitting part 55 (S6).

In the embodiment, the case in which it is necessary to move the cleaner body 10 may be a case in which the distance between the ultrasonic wave transmitting part 55 and the cleaner body 10 is a first reference distance or more. At this point, the control part 70 controls the cleaner body 10 to be moved in a direction which becomes closer to the ultrasonic wave transmitting part 55. Accordingly, the cleaner body 10 may move forward to the ultrasonic wave transmitting part 55. Here, the first reference distance may be varied according to the length of the connection hose.

Also, even when the distance between the ultrasonic wave transmitting part 55 and the cleaner body 10 is a second reference distance or less, it may be necessary to move the cleaner body 10. At this point, the control part 70 controls the cleaner body 10 to be moved in a direction which becomes distant from the ultrasonic wave transmitting part 55. Accordingly, the cleaner body 10 may move backward in a direction opposite to the ultrasonic wave transmitting part 55. Here, the second reference distance may be varied according to a user's stride, height or the like. Here, the first reference distance may be defined greater than the second reference distance.

When the distance between the ultrasonic wave transmitting part 55 and the cleaner body 10 is the first reference distance or more, the cleaner body 10 is distant from the user, and thus for the user's convenience, forward movement of the cleaner body 10 is required. However, when the distance between the ultrasonic wave transmitting part 55 and the cleaner body 10 is the second reference distance or less, backward movement of the cleaner body 10 is required to prevent collision with the user.

Eventually, when the distance between the ultrasonic wave transmitting part 55 and the cleaner body 10 is the first reference distance or more or the second reference distance or less, the movement of the cleaner body 10 is required.

As a result of determination in the operation S6, when the movement of the cleaner body 10 is required, the control part 70 produces a plurality of moving routes which are connected from the departure route to a target location, and selects one of the plurality of moving routes (S7).

For example, the control part 70 produces the plurality of moving routes which extend from the departure route to the target location. The control part 70 may set the target location based on a distance between the cleaner body 10 and the suction unit 20. Specifically, the target location is determined based on the distance between the ultrasonic wave transmitting part 55 and the ultrasonic wave receiving part 60, and may be a plurality of points within an area in which a distance thereof is the first reference distance or less and the second reference distance or more. The control part 70 may set the target location by selecting one of the plurality of points.

Since the control part 70 may produce the plurality of moving routes by extending one departure route, the number of produced moving routes may be the same as or greater than that of the departure routes.

And an optimal moving route of the plurality of produced moving routes may be selected. For example, the optimal moving route may be a route of the plurality of produced moving routes which has the shortest distance. That is, a route of the plurality of produced moving routes in which a moving distance of the cleaner body 10 is the shortest may be selected. The shortest route may be realized with an algorithm, and may be realized with one of a Dijkstra algorithm, a Bellman-Ford algorithm, an A* algorithm and a Floyd-Warshall algorithm, but is not limited thereto.

The control part 70 operates one or more of the first motor 15 and the second motor 16 so that the vacuum cleaner 1 is moved along the selected moving route (S8).

For example, the cleaner body 10 may be moved forward or backward by a predetermined distance from a current position. That is, the control part 70 may control each of the motors 15 and 16 to be rotated. At this point, a moving distance of each of the wheels may be the same by harmonizing the number of revolutions, and the cleaner body 10 is moved forward or backward.

As another example, the cleaner body 10 may be controlled to be turned to one side. To turn the cleaner body 10 to the left side, the control part 70 may control the first motor 15 and the second motor 16 so that a RPM of the second motor 16 is greater than that of the first motor 15. However, to turn the cleaner body 10 to the right side, the control part 70 may control the first motor 15 and the second motor 16 so that the RPM of the first motor 15 is greater than that of the second motor 16. At this point, a turning radius may be controlled by changing a different between the RPM of the first motor 15 and the RPM of the second motor 16.

As still another example, the cleaner body 10 may be controlled so that the direction thereof is changed. To change the direction of the cleaner body 10 to one side, the control part 70 may control the first motor 15 and the second motor 16. At this point, an angle for a change of direction may be controlled according to the RPM of each of the motors 15 and 16.

As the result of determination in the operation S6, when the movement of the cleaner body 10 is not required, that is, the distance between the ultrasonic wave transmitting part 55 and the cleaner body 10 is the first reference distance or less and the second reference distance or more, an ultrasonic wave signal is received again (S3), and a distance value to the ultrasonic wave transmitting part 55 is determined (S4), and the location of the ultrasonic wave transmitting part 55 is determined (S5), and then it is determined whether movement of the vacuum cleaner 1 is required (S6).

Meanwhile, the control part 70 may determine whether the wheels of the cleaner body 10 are not in contact with the floor surface, based on the distance from the floor surface.

When it is determined that the wheels of the cleaner body 10 are not in contact with the floor surface, it may be determined that the movement of the cleaner body 10 is not required. That is, when the control part 70 determines that the distance from the floor surface which is detected by the detecting part 50 is a predetermined distance or more, it is recognized as a case in which the movement of the cleaner body 10 is not required to prevent a user's injury, and thus the moving unit may be controlled to be stopped.

Since the floor surface may serve as a reflecting surface of the light wave, when the cleaner body 10 becomes distant from the floor surface (e.g., the cleaner body 10 is lifted up by the user), an amount of the light wave received by the one or more light wave receiving parts is considerably reduced, and thus the control part 70 may recognize that the wheels are not in contact with the floor surface.

According to the proposed embodiment, in the case in which the movement of the cleaner body 10 is required in a direction in which the user moves, when an obstacle exists on a route along which the user moves to a destination, it is possible to avoid the obstacle, and the cleaner body 10 may be rapidly and accurately moved in the direction in which the user moves.

Also, since lifting-up of the cleaner body 10 is detected, and rotation of the wheels is controlled, the user may be prevented from being injured by the rotation of the wheels.

Also, since the rotation of the wheels is prevented when the lifting-up of the cleaner body 10 is detected, the user's clothes may be prevented from being caught in a gap between the wheel and the cleaner body 10 due to the rotation of the wheels.

FIG. 7 is a block diagram of a vacuum cleaner according to another embodiment of the present invention.

Referring to FIG. 7, a detecting part 50 according to another embodiment of the present invention may include a plurality of detecting parts 50. That is, the detecting part 50 may include a first detecting part 51 and a second detecting part 52.

For example, the first detecting part 51 may detect an obstacle, and the second detecting part 52 may detect a state of the cleaner body 10.

A detecting function of the first detecting part 51 which detects a distance from the obstacle and a location thereof is the same as that in the previous embodiment. The second detecting part 52 may be used to detect whether the wheels of the cleaner body 10 is spaced apart from the floor surface.

When the cleaner body 10 is not in contact with the floor surface, the user may be prevented from being injured by controlling the motor.

Like the first detecting part 51, the second detecting part 52 may be a light wave sensor which detects the distance from the floor surface. Therefore, when the cleaner body 10 is distant from the floor surface in a predetermined distance or more, it may be determined that the vacuum cleaner is not in contact with the floor surface, and thus the motor may be stopped.

Alternatively, the second detecting part 52 may be an acceleration sensor or a gyro sensor. More specifically, when the cleaner body 10 is lifted upward from the floor surface by the user, and an acceleration or an angular acceleration having a predetermined value or more is generated upward in a moment, the control part 70 may determine that the cleaner body 10 is not in contact with the floor surface, and may stop the motor.

The embodiment may be applied to the cases in which the cleaner body 10 is in three-point contact with the floor surface by the first and second wheels and the subsidiary wheel and is in two-point contact with the floor surface by only the first and second wheels without the subsidiary wheel.

FIG. 8 is a flowchart illustrating a method for controlling the vacuum cleaner according to another embodiment of the present invention. Referring to FIG. 8, while a cleaning operation is performed using the vacuum cleaner 1, a ultrasonic wave may be transmitted from the ultrasonic wave transmitting part 55. Then, the ultrasonic wave receiving part 60 receives the ultrasonic wave transmitted from the ultrasonic wave transmitting part 55 (S10).

The control part 70 determines a distance value between the ultrasonic wave transmitting part 55 and each of the receiving parts 61, 62 and 63 based on the ultrasonic wave received by each of the receiving parts 61, 62 and 63 (S20).

And the control part 70 determines a location of the ultrasonic wave transmitting part 55 using a plurality of determined distance values (S30).

And the control part 70 determines whether it is necessary to move the cleaner body 10, based on the determined location of the ultrasonic wave transmitting part 55 (S40).

The control part 70 determines whether an obstacle is detected by the detecting part 50 (S50).

In the operation S50, when the obstacle is detected, the control part 70 determines an avoidance route which extends from the cleaner body 10 to a target location, based on the location of the obstacle, and then operates one or more of the first motor 15 and the second motor 16 so that the vacuum cleaner is moved along the avoidance route to the target location (S60).

In the operation S50, when the obstacle is not detected, the control part 70 produces a moving route which extends to the target location, and then operates the first and second motors (S70).

According to the proposed invention, since the cleaner body 10 may move along a user's motion, the user does need to directly move the cleaner body 10, and thus the user's convenience may be enhanced.

Also, since it is determined whether an obstacle exists on a route along which the user moves to a destination, and it is possible to avoid the obstacle, the cleaner body 10 may be accurately moved in the direction in which the user moves.

In the specification, the ultrasonic wave transmitting part and the ultrasonic wave receiving part are elements for detecting movement of the suction unit, and may be referred to as a detecting unit.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A vacuum cleaner comprising:
 a cleaner body having a moving unit for movement;
 a suction unit connected to the cleaner body, configured to suction dust and air and to guide the suctioned dust and air to the cleaner body, and having a handle;
 a first detecting unit configured to detect a distance between the cleaner body and the suction unit;
 a second detecting unit provided at the cleaner body to detect an obstacle; and
 a control part configured to control the moving unit,
 wherein the control part is configured to:
  determine a plurality of departure routes based on a location of the obstacle detected by the second detecting unit and a distance between the obstacle and the cleaner body,
  determine whether a movement of the cleaner body is required to avoid the obstacle based on the distance between the cleaner body and the suction unit detected by the first detecting unit, set a target location of the cleaner body after determining the plurality of departure routes, and determine a moving route of the cleaner body from one of the plurality of departure routes to the target location based on determining that the movement of the cleaner body is required to avoid the obstacle.

2. The vacuum cleaner according to claim 1, wherein the plurality of departure routes include an avoidance route along which the cleaner body avoids the obstacle.

3. The vacuum cleaner according to claim 2, wherein the control part controls the cleaner body to be turned to a left or right side, and thus to avoid the obstacle.

4. The vacuum cleaner according to claim 2, wherein the control part controls the cleaner body to be moved backward in a predetermined distance, then to be turned to a left or right side, and thus to avoid the obstacle.

5. The vacuum cleaner according to claim 1, wherein the first detecting unit comprises an ultrasonic wave transmitting part that is provided at the suction unit and that is configured to transmit an ultrasonic wave, and an ultrasonic wave receiving part that is provided at the cleaner body and that is configured to receive the ultrasonic wave transmitted from the ultrasonic wave transmitting part, and wherein the control part controls the moving unit to move the cleaner body based on a distance between the ultrasonic wave transmitting part and the ultrasonic wave receiving part.

6. The vacuum cleaner according to claim 5, wherein the control part is configured to, based on the distance between the ultrasonic wave transmitting part and the ultrasonic wave receiving part being greater than or equal to a first reference distance, control the cleaner body to be moved in a direction in which the ultrasonic wave receiving part becomes closer to the ultrasonic wave transmitting part.

7. The vacuum cleaner according to claim 5, wherein the control part is configured to, based on the distance between the ultrasonic wave transmitting part and the ultrasonic wave receiving part being less than or equal to a second reference distance, control the cleaner body to be moved in a direction in which the ultrasonic wave receiving part becomes distant from the ultrasonic wave transmitting part.

8. The vacuum cleaner according to claim 5, wherein the control part is configured to, based on the distance between the ultrasonic wave transmitting part and the ultrasonic wave receiving part being greater than or equal to a first reference distance or being less than or equal to a second reference distance, control the cleaner body to be moved, and wherein the first reference distance is greater than the second reference distance.

9. The vacuum cleaner according to claim 1, wherein the control part is configured to determine a distance between a floor surface and the cleaner body based on information detected by the second detecting unit, and control the moving unit to be stopped based on the distance between the floor surface and the cleaner body being greater than or equal to a reference distance.

10. The vacuum cleaner according to claim 9, wherein the second detecting unit comprises a first detecting part that detects the obstacle, and a second detecting part that determines the distance between the floor surface and the cleaner body.

11. A method for controlling a vacuum cleaner, comprising:

determining existence and absence of an obstacle, and determining a plurality of departure routes according to a location of the obstacle and a distance between a cleaner body and the obstacle;

detecting movement of a suction unit connected to the cleaner body, and setting a target location of the cleaner body;

determining a moving route of the cleaner body from one of the plurality of departure routes to the target location; and controlling a moving unit provided at the cleaner body to move the cleaner body along the moving route.

12. The method according to claim 11, wherein controlling the moving unit is performed to move the cleaner body backward, turn the cleaner body to a left or right side, and then move the cleaner body.

13. The method according to claim 11, wherein controlling the moving unit is performed to turn the cleaner body to a left or right side and then move the cleaner body.

14. The method according to claim 11, wherein the cleaner body comprises a detecting part that detects a distance between a floor surface and the cleaner body, and wherein controlling the moving unit comprises stopping the cleaner body based on the distance between the floor surface and the cleaner body being greater than or equal to a reference distance.

15. The method according to claim 11, further comprising determining whether a movement of the cleaner body is required is to avoid the obstacle based on a distance between the cleaner body and the suction unit.

16. The method according to claim 15, wherein determining the moving route of the cleaner body is performed based on determining that the movement of the cleaner body is required to avoid the obstacle.

* * * * *